US005252990A

United States Patent [19]

Suzuki et al.

[11] Patent Number: 5,252,990

[45] Date of Patent: Oct. 12, 1993

[54] OPTICAL PRINTER HEAD EMPLOYING A PHOSPHOR FOR EMITTING LIGHT

[75] Inventors: Akihiro Suzuki, Nishio; Makoto Suzuki, Nagoya, both of Japan

[73] Assignee: Brother Kogyo Kabushiki Kaisha, Nagoya, Japan

[21] Appl. No.: 814,798

[22] Filed: Dec. 31, 1991

[30] Foreign Application Priority Data

Jan. 9, 1991 [JP] Japan .................................. 3-013025

[51] Int. Cl.[5] .......................... G01D 15/14; H01J 5/16

[52] U.S. Cl. ................................ 346/107 R; 313/110; 313/496; 313/497

[58] Field of Search ..................... 346/107 R; 313/110, 313/111, 496, 497

[56] References Cited

U.S. PATENT DOCUMENTS 4,549,784 10/1985 Inokuchi ............................ 355/1 X
4,578,615 3/1986 Genovese et al. .................. 313/497
4,743,800 5/1988 Mimura et al. ..................... 313/497
4,836,652 6/1989 Oishi et al. ........................... 359/40
4,847,492 7/1989 Houki .

*Primary Examiner*—Benjamin R. Fuller
*Assistant Examiner*—David Yockey
*Attorney, Agent, or Firm*—Oliff & Berridge

[57] ABSTRACT

An optical printer head for a recording apparatus which records an image on a photoconductive material is disclosed. The optical printer head confronts the photoconductive material. The optical printer head has a transparent substrate, a cathode unit for emitting electrons and an anode unit for receiving the electrons emitted from the cathode unit. The anode unit is formed of transparent conductive film and provided on the transparent substrate. A phosphor unit is provided on the anode. When the phosphor unit emits light resulting from impingement of electrons which are directed from the cathode unit to the anode unit, light emitted from the phosphor unit is transmitted through the transparent substrate and the anode. A grid is provided for attracting electrons from the cathode toward the phosphor unit. A lens is provided in the substrate for focusing the light emitted by the phosphor unit. An evacuated enclosure surrounds the cathode unit, the grid, the phosphor unit, and the anode unit.

12 Claims, 2 Drawing Sheets

OPTICAL PRINTER HEAD EMPLOYING A PHOSPHOR FOR EMITTING LIGHT

BACKGROUND OF THE INVENTION

1. Field of Invention

The present invention relates to an optical printer head employing a phosphor for emitting light and, more particularly, to an optical printer head which is equipped with a recording device that records data output from a computer on a recording sheet.

2. Description of Related Art

Conventionally, a recording device employing an optical printer head is known. Optical printer heads employ such means as polygon mirrors, galvanno mirrors, liquid crystal shutter arrays, LED arrays or vacuum fluorescent display devices to form a latent image on a photoconductive material.

Optical printer heads employing polygon mirrors or galvanno mirrors, for example, as shown in U.S. Pat. No. 4,847,492, employ a large optical system for scanning and condensing a light beam emitted by single light source on the photoconductive material. Optical printer heads employing a liquid crystal shutter array exhibit difficulties in forming latent images having sufficient contrast on the photoconductive material, so that the image formed on a recording medium does not have sufficient contrast. Optical printer heads employing an LED array have low production efficiencies.

Optical printer heads having a liquid crystal shutter array, an LED array or a fluorescent display device must include an optical system, such as the roof mirror lens array, or a self focus lens, which focuses light on a photoconductive material. As a result, such optical printer heads have complicated structures. When roof mirror lens arrays or self focus lens arrays are used, long optical distance is required to focus light on the photoconductive material through the lens. Therefore the optical printer head has large size.

SUMMARY OF THE INVENTION

It is an object of the present invention to provide an optical printer head having a compact and simple structure. 5 Another object of the present invention is to provide an optical printer head which is employed in a recording device that records data output from a computer on a recording sheet.

To achieve the above objects, an optical printer head comprises a transparent substrate supporting a frame of the optical printer; a cathode member for emitting electrons and being provided inside of the frame; an anode member for receiving thermal electrons emitted from the cathode member and the anode member being formed of transparent conductive member and provided on the transparent substrate and inside of the frame; and a phosphor member provided on the anode member and inside of the frame and for emitting light based on the thermal electrons directed to the anode member from the cathode member, the emitted light from the phosphor member is transmitted through both the anode member and the transparent substrate to the outside of the printer head.

According to the optical printer head of the invention, a cathode member emits thermal electrons to an anode member which is provided on the transparent substrate and receives the thermal electrons. The phosphor member is provided on the anode member and emits light based on the thermal electrons directed to the anode member.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENT

Figure 1:
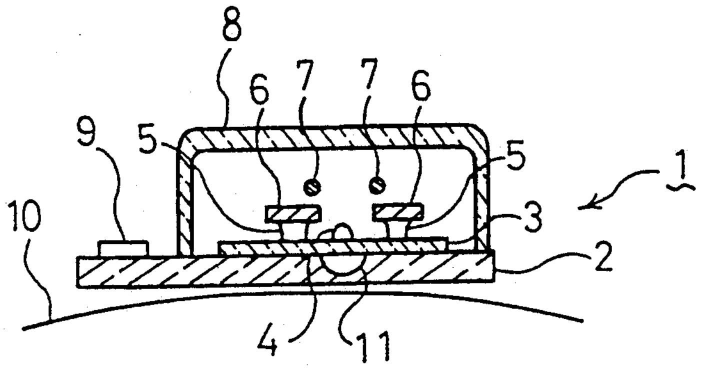
FIG. 1 is a cross sectional view showing the principal elements of a light printer head.
Figure 2:
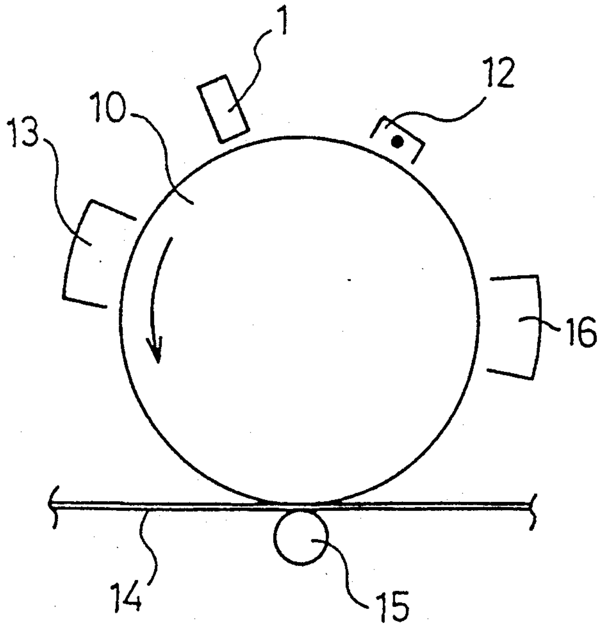
FIG. 2 is a cross sectional view showing a recording device employing the light printer head.

Hereinafter, an embodiment of the present invention will be explained with reference to FIGS. 1-3.

A light printer head 1 is equipped in the recording apparatus which records an image on a recording paper. As shown in FIG. 2, the light printer head 1 for forming a latent image on a photosensitive drum 10 is disposed along a circumference of the photosensitive drum 10. Arranged around the circumference of the photoconductive drum 10 are a charger 12, for charging the photoconductive drum 10, and a toner case 13, for storing toner (not shown), and having a coating member (not shown) for coating the toner on the latent image of the photoconductive drum 10. In addition, a transferring roller 15 for transferring the attached toner from the drum 10 to a paper sheet 14 fed between the drum and the roller and a cleaning unit 16 for cleaning the photoconductive drum 10 to remove toner adhered to the photoconductive drum 10 are also arranged along the circumference of the drum.

In the recording apparatus, the photoconductive drum 10 is rotated in a counterclockwise direction. The light printer head 1 emits light corresponding to image information to form a latent image on the photosensitive drum 10 during the rotation of the photoconductive drum 10, after the charger 12 charges the photoconductive drum 10. After the coating member of the toner case 13 coats the toner on the latent image of the photoconductive drum 10 during the rotation, the toner coated on the photoconductive drum 10 is transferred to the paper 14 which is fed between the transferring roller 15 and the photoconductive drum 10 in synchronism with rotation of the photoconductive drum 10. The cleaning unit 16 cleans the photoconductive drum 10 to remove any residual toner adhered to the photoconductive drum 10, after toner is transferred to the paper 14. This process is repeated for each image to be formed. The charger 12, the toner case 13, the transferring roller 15 and the cleaning unit 16 are known in the art and are shown, for example, in U.S. Pat. No. 4,847,492, the disclosure of which is incorporated by reference herein. Thus detailed descriptions of these elements are omitted.

Figure 3:
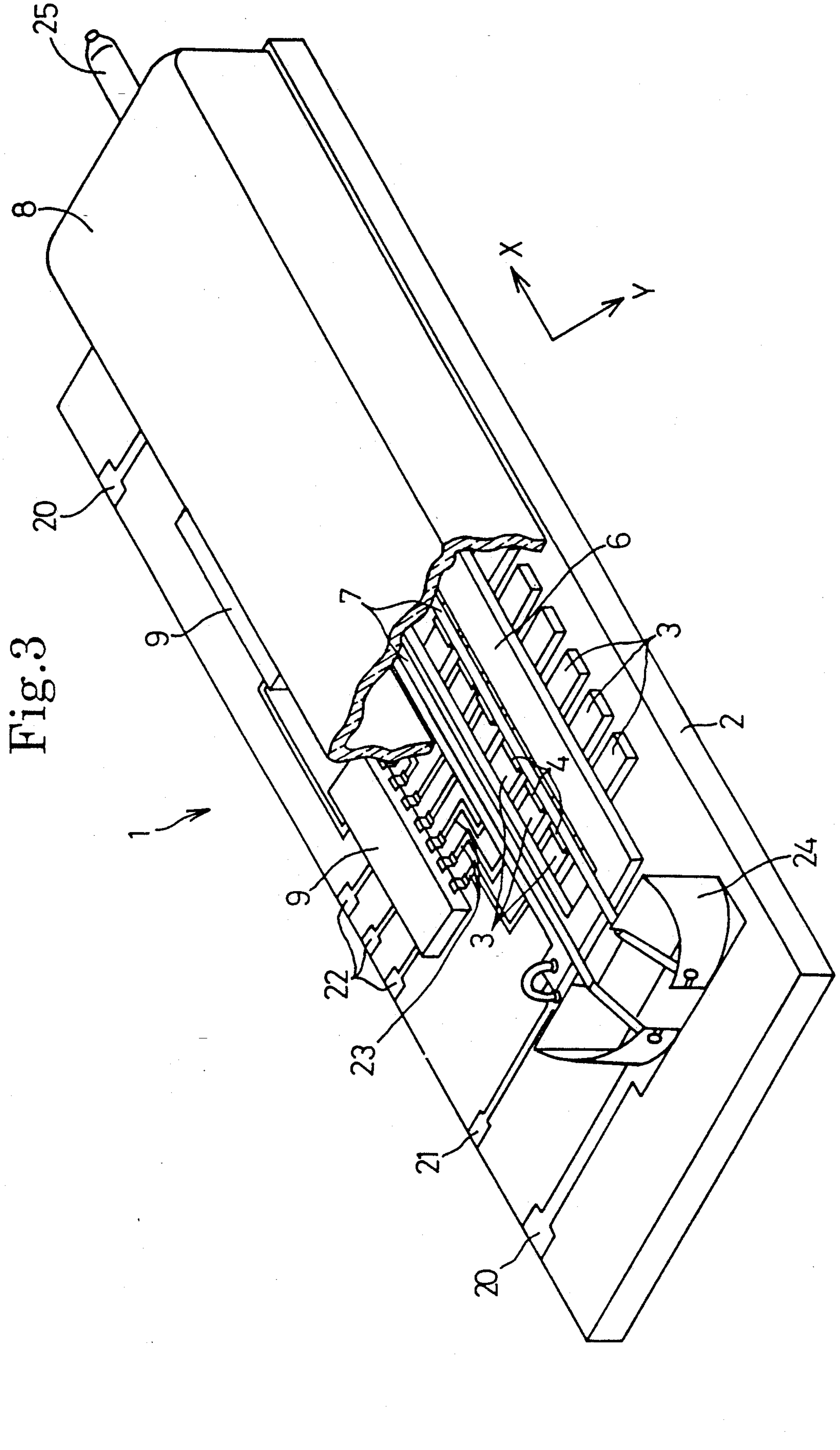
FIG. 3 is a perspective view showing the light printer head shown in FIG. 1.

As shown in FIG. 3, the light printer head comprises a transparent, planar substrate 2 which extends along a longitudinal direction parallel with an arrow X (which is substantially parallel to the axis of drum 10) and along a traverse direction parallel with an arrow Y. The paper 14 is fed in a direction parallel to the traverse direction. The length of the transparent substrate 2 corresponds to width of the image to be formed on the photosensitive drum 10. The transparent substrate 2 has transparent electrode patterns 20, 21, 22 and 23, described below, on the transparent substrate 2. The method employed in forming the transparent electrode patterns 20, 21, 22 and 23 is a known IC pattern forming method.

Alternatively, the light printer head can be used to expose an imaging member or sheet that comprises a photosensitive layer and a photoconductive layer, such as shown in U.S. Pat. No. 4,969,012, the disclosure of which is incorporated by reference herein. In this case, the imaging sheet is conveyed beneath the transparent substrate 2 for exposure by the light printer head 1.

A plurality of anodes 3, which function as anode means, are arranged in a row parallel along the longitudinal direction of the substrate 2 and are formed on the transparent substrate 2. Each anode 3 is made of a strip of transparent conductive film which extends along the traverse direction independently. An end of the each anode 3 is electrically coupled with the transparent electrode patterns 23, respectively. Indium tin oxide (ITO) film can be used as the transparent conductive film of the anode 3. Preferably this material is a tin doped indium oxide ($In_2O_3$) in which the ratio of tin to indium oxide is about 1 to 20. The transparent conductive film can be deposited by known vacuum evaporation methods. The thickness of the film 3 may be on the order of 0.2 micrometers. Other materials, for example tin oxide, may also be used to form the anodes 3. Such materials are also deposited by known vacuum evaporation methods.

A phosphor element 4, which functions as a phosphor means, is mounted on each anode 3. The phosphor element may be formed of zinc oxide or of a compound of zinc oxide and zinc. The high density, high intensity phosphor elements are formed on the anodes 3 by known patterning methods, such as by electrophoresis methods and the so-called "lift-off" method (which decreases organic contamination). Such methods are known and no further explanation is necessary.

A pair of cathode supporting members 24 which are formed of a conductive material are provided on both ends of the transparent substrate 2 in respect to the longitudinal direction and are electrically coupled with the transparent electrode patterns 20. A pair of cathodes 7, which are extended along the longitudinal direction, are spaces apart from each other and the anodes 3. A pair of insulators 5 (shown in FIG. 1), which extend in the longitudinal direction, are mounted on the anodes 3. As another embodiment, a pair of insulators 5 may be mounted on the transparent substrate 2. Moreover, a grid 6 is mounted on the transparent substrate 2 by the insulators 5. The grid 6 extends in the longitudinal direction and has an open central portion (as shown in FIG. 1) to permit the flow of thermal electrons toward the anodes 3. The grid 6 is connected to a control electrode (not shown) through the transparent electrode pattern 21, so that thermal electrons emitted from the cathode 7 are focused on the phosphors 4 on the anodes 3 by the grid 6. The grid 6 may be formed of suitable metallic materials, and a preferred material is stainless steel. In a typical arrangement, an electrical potential of 20 or 30 volts is applied to the grid to attract electrons from the cathodes 7 and an electrical potential of about 20 volts is applied to the anodes 3 to further attract the electrons attracted by the grid. An alternating current of about 3 volts is applied to the cathode to attain thermal emission of electrons.

A cover 8, which is mounted on the transparent substrate 2, covers the anode 3, the phosphor 4, the grid 6 and the cathode 7, which are mounted on the substrate 2. The cover 8 may be formed of glass and may be bonded to the substrate 2 by a suitable material, such as a low melting point flint glass. An evacuation port 25 is provided through an end wall of the cover 8 and is connected to a vacuum pump (not shown) to draw air out of the interior enclosed by both the cover 8 and the substrate 2. After the vacuum is drawn, the evacuation port 25 is sealed and the anode 3, the phosphor 4, the grid 6 and the cathode 7 are enclosed within both the cover 8 and the substrate 2 and are, thus, kept under vacuum. The cover 8 functions as frame.

A plurality of driving elements 9, such as IC driving chips, for independently driving each of the plurality of anodes 3 are provided on the transparent substrate 2 and each of the multiplicity of output leads of the driving elements 9 are connected to one of the leads of the transparent electrode patterns 23, respectively, in order to connect to each anode 3. As another embodiment, the electrode patterns 21, 23 may not be transparent. A multiplicity of input leads of driving elements 9 are connected to the transparent electrode patterns 22, respectively, in order to connect to a data source, such as output from a computer (not shown). The light printer head 1 is positioned adjacent the photosensitive drum 10 with a predetermined space therebetween such that an interval between the photosensitive drum 10 and the transparent substrate 2 is, for example, 2 millimeters.

The substrate 2 is formed of a glass 1 which has a refractive index, for example, of about 1.5. An example of a glass material forming the transparent substrate 2 contains silicon dioxide ($SiO_2$) and sodium in a ratio of about 7 to 3. A selective ion exchange process between the sodium in the substrate 2 and thallium in a soluble salt is performed through a mask by an ion exchange method, so that a multiplicity of disc-shaped planar microlenses 11 arranged in a row parallel with the longitudinal direction are formed in the transparent substrate 2, as shown in FIG. 1. Alternatively, lithium (Li) or cesium (Cs) in soluble salts can be employed in the selective ion exchange process. The ion exchange method for forming the row of planar microlenses 11 in the transparent substrate 2 is disclosed in U.S. Pat. Ser. No. 07/711,304, Pat. No. 5,157,746 filed June 6, 1991 and owned by the assignee of this application. The disclosure of this application is incorporated by reference. After the ion exchange process, planar microlenses 11 are formed having an index of refraction 1.7 or more. Thus the difference in the refractive index between the transparent substrate and the planar microlenses 11 is at least about 0.2.

As described above, individual disc-shaped planar microlenses 11, are formed in the substrate 2 beneath each anode at the location of each phosphor element 4, by the selective ion exchange process. The formation of the microlenses 11 is desirable because light emitted by the phosphor elements 4 tends to spread as it is transmitted in the glass substrate 2. The magnitude of the light spot projected onto the photoconductive drum or other photosensitive imaging medium should be limited, so that a clear latent image is formed. The light emitted by the phosphor elements 4 is focused by the microlenses 11, in order to limit the magnitude of the light spot on the photoconductive drum or other light-receiving element, thereby improving the resolution of the latent image.

Next, formation of the latent image on the photo-sensitive drum 10 by the light printer head 1 will be explained. Thermal electrons emitted from the cathodes 7 pass through the phosphors 4 and travel to the anodes 3 while being focused by the grid 6. At this time, a part of the thermal electrons are absorbed into the phosphors 4 and stimulate the phosphors 4, so that the phosphors 4 emit light based on the energy of the thermal electrons. The light emitted from the phosphors 4 passes through the anodes 3 and the planar microlenses formed in the transparent substrate 2, beyond the transparent substrate 2, and is focused on the photosensitive drum 10, so that the latent image is formed on the photosensitive drum 10.

In t his embodiment, the diameter of each planar microlenses 11 is about 0.1 mm, the difference in refractive index between the planar microlenses and the substrate 2 is 0.2, and Numerical Aperture (NA) is 0.2. The thickness of the anode 3 is 0.2 micrometers, the thickness of the transparent substrate 2 is about 2 mm. With this configuration, a spot of light on the photosensitive drum 10 from each phosphor is about 80 microns.

Numerical Aperture is a measure of the divergence of the light beams passing through substrate 2 and a microlens 11. The Numerical Aperture and the distance between the surface of glass substrate 2 and the surface of drum 10 determine the diameter of the light spot on the drum 10.

It is to be understood that the present invention is not limited to the above described embodiments, and various modifications and alterations can be added there to without departing from the scope of the inventions encompassed by the appended claims.

What is claimed is:

1. An optical printer head comprising:
- a transparent substrate having two surfaces;
- cathode means for emitting electrons, said cathode means being spaced from the transparent substrate;
- anode means for attracting the electrons emitted from said cathode means, said anode means including a plurality of anodes arranged in a row, each of said anodes being formed of a transparent conductive member and being provided on said transparent substrate;
- a plurality of phosphors each of which is provided on one of said anodes, said phosphors emitting light as a result of impingement of the electrons emitted by said cathode means and attracted by said anodes passing through said phosphors; and
- a plurality of microlenses integrally formed on only one surface of said transparent substrate, each of said microlenses being located beneath one of said anodes so that the emitted light from said phosphors is transmitted through both said anodes and said microlenses in said transparent substrate.

2. The optical printer head according to claim 1, wherein said transparent substrate is formed of glass.

3. The optical printer head according to claim 1, further comprising grid means for attracting said electrons toward the anode means, said grid means being disposed between said cathode means and said anode means.

4. An optical printer head according to claim 1, wherein said one surface of said substrate in which said microlenses are formed is adjacent said anode means.

5. A recording apparatus comprising:
- a photoconductive material; and
- an optical printer head facing the photoconductive material, the optical printer head including
  - a transparent substrate having two surfaces;
  - cathode means for emitting thermal electrons, said cathode means being mounted on the substrate;
  - anode means for attracting the thermal electrons emitted from said cathode means, said anode means having a plurality of anodes each of which is formed of a transparent conductive member and is provided on said transparent substrate;
  - a plurality of phosphors each of which is provided on one of said anodes, said phosphors emitting light as a result of impingement of the thermal electrons, which are emitted by said cathode means and attracted by said anodes passing through said phosphors; and
  - a plurality of microlenses integrally formed in only one surface of said transparent substrate, each of said microlenses being located beneath one of said anodes so that the emitted light from said phosphors is transmitted to said photoconductive material through both said anodes and said microlenses in said transparent substrate.

6. The recording apparatus according to claim 5, wherein the distance between said photoconductive material and said transparent substrate is about 2 millimeters.

7. The recording apparatus according to claim 5, wherein the transparent substrate extends across a dimension of the photoconductive material and the plurality of phosphors and the plurality of anodes extend along said dimension of the photoconductive material.

8. The recording apparatus according to claim 7, wherein the plurality of phosphors are arranged in a row on the plurality of anodes which are arranged in a row.

9. A recording apparatus according to claim 5, wherein said one surface of said substrate in which said microlenses are formed is adjacent said anode means.

10. An optical printer head comprising:
- a light transmissive substrate having two surfaces;
- electron emitting means for emitting electrons toward the light transmissive substrate;
- means disposed on the substrate for attracting the electrons emitted from the electron emitting means, said electron attracting means having a plurality of anodes each of which is formed of a light transmitting conductive material;
- a plurality of phosphors each of which is provided on one of such anodes and receives the electrons emitted from the electron emitting means toward the electron attracting means, so that said phosphors emit light as a result of impingement of said electrons passing through said phosphor; and
- a plurality of microlens portions integrally formed in only one surface of said light transmissive substrate by an ion exchange process, each of said microlens portions having a refractive index higher than an adjacent portion of said light transmissive substrate and being located beneath one of said anodes whereby the emitted light from said phosphors is transmitted through both said anodes and sand microlens portions of said light transmissive substrate.

11. An optical printer head as in claim 10, further comprising a gird means for attracting the electrons emitted from the electron emitting means toward the electron attracting means.

12. Anoptical printer head accordng to claim 10, wherein said one surface of said substrate in which said microlenses are formed is adjacent said anode means.

* * * * *